UNITED STATES PATENT OFFICE.

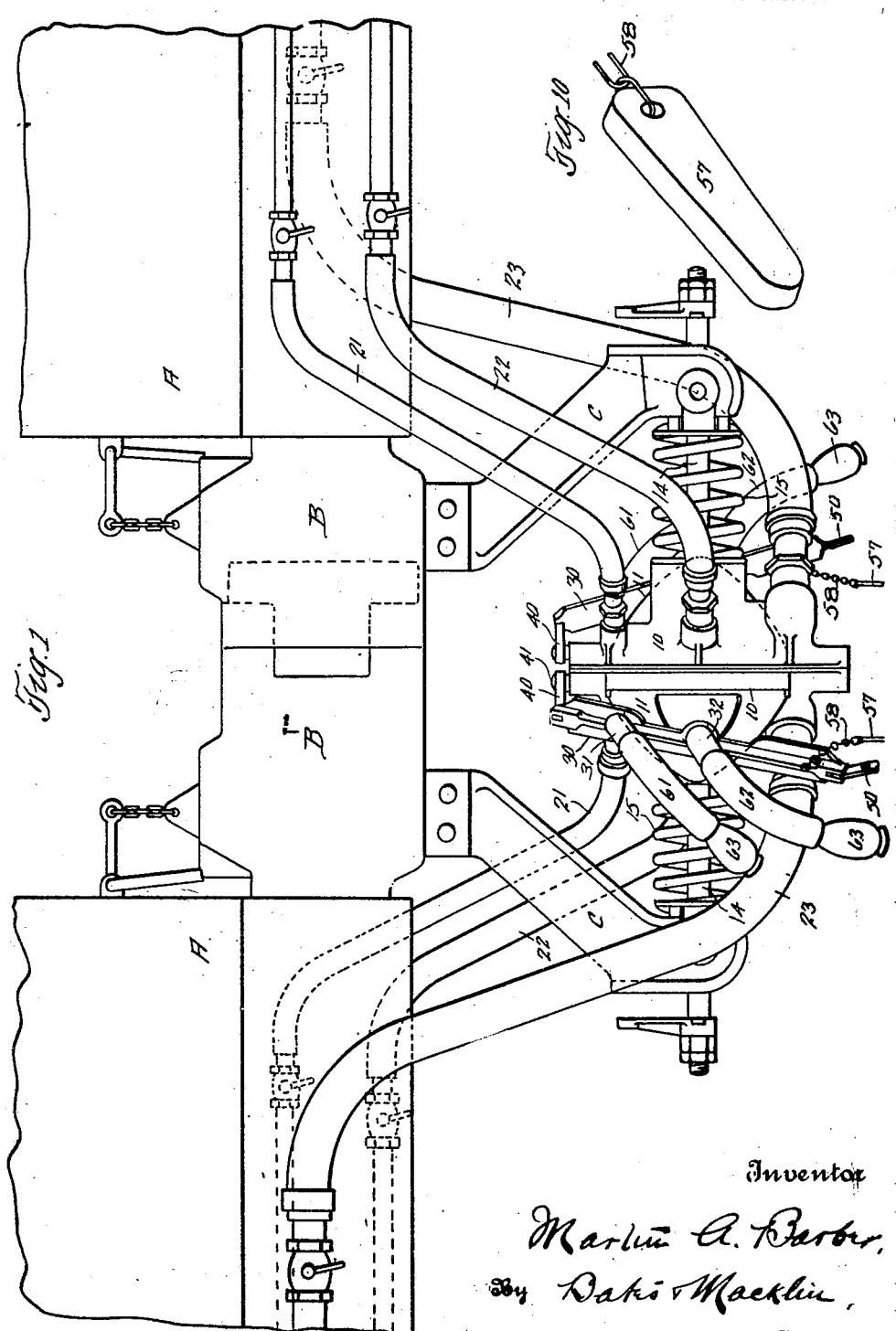

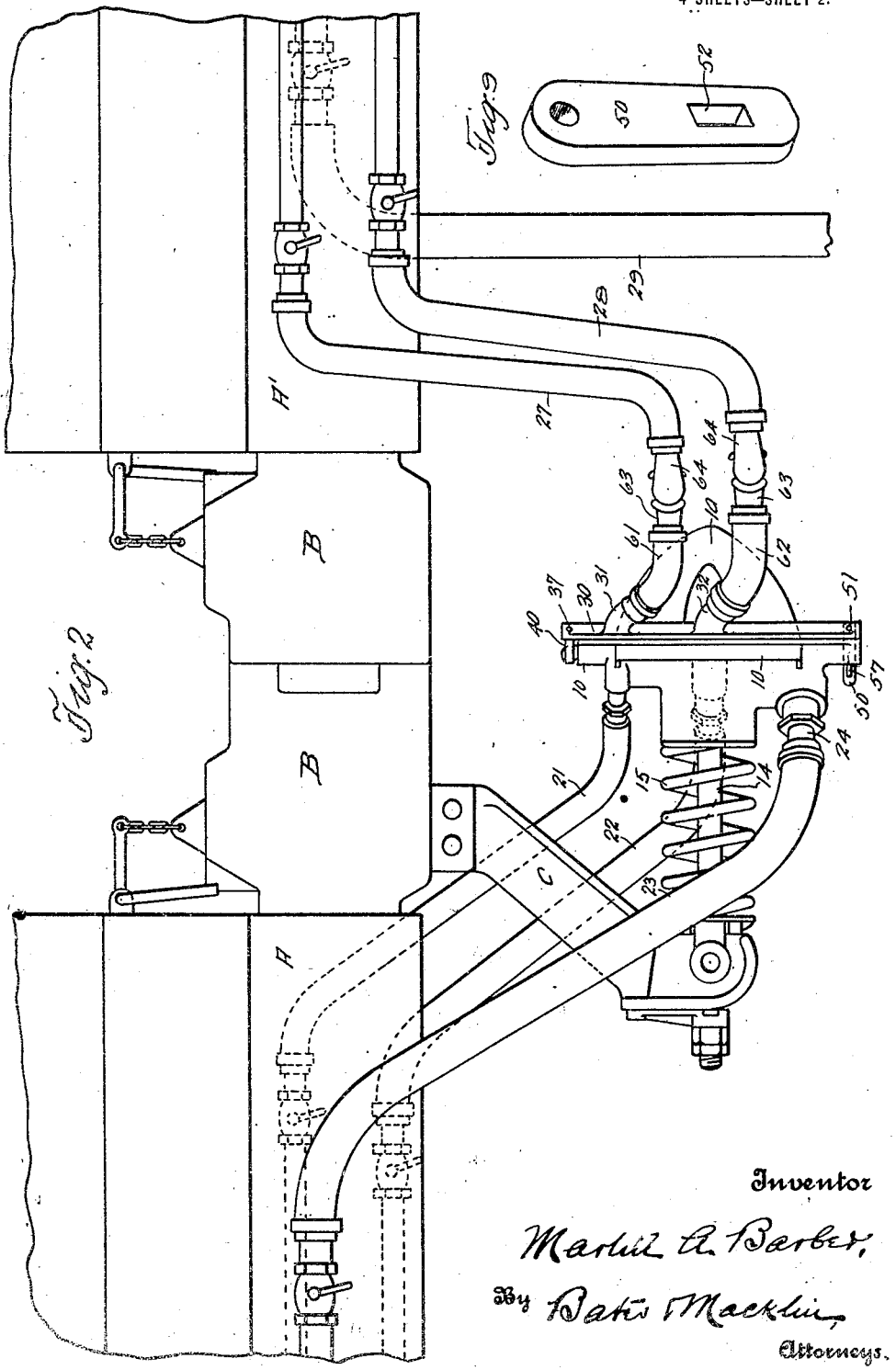

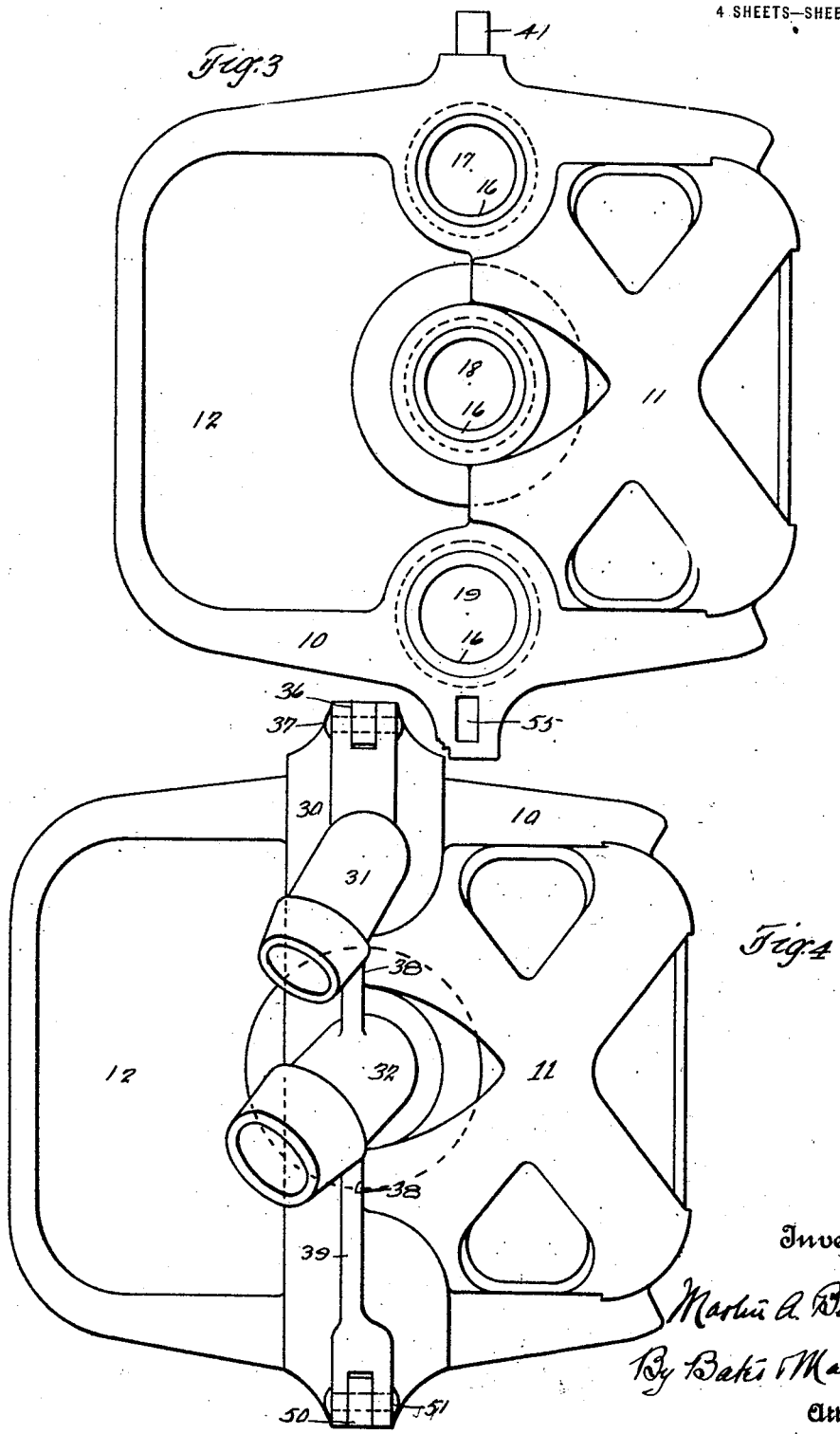

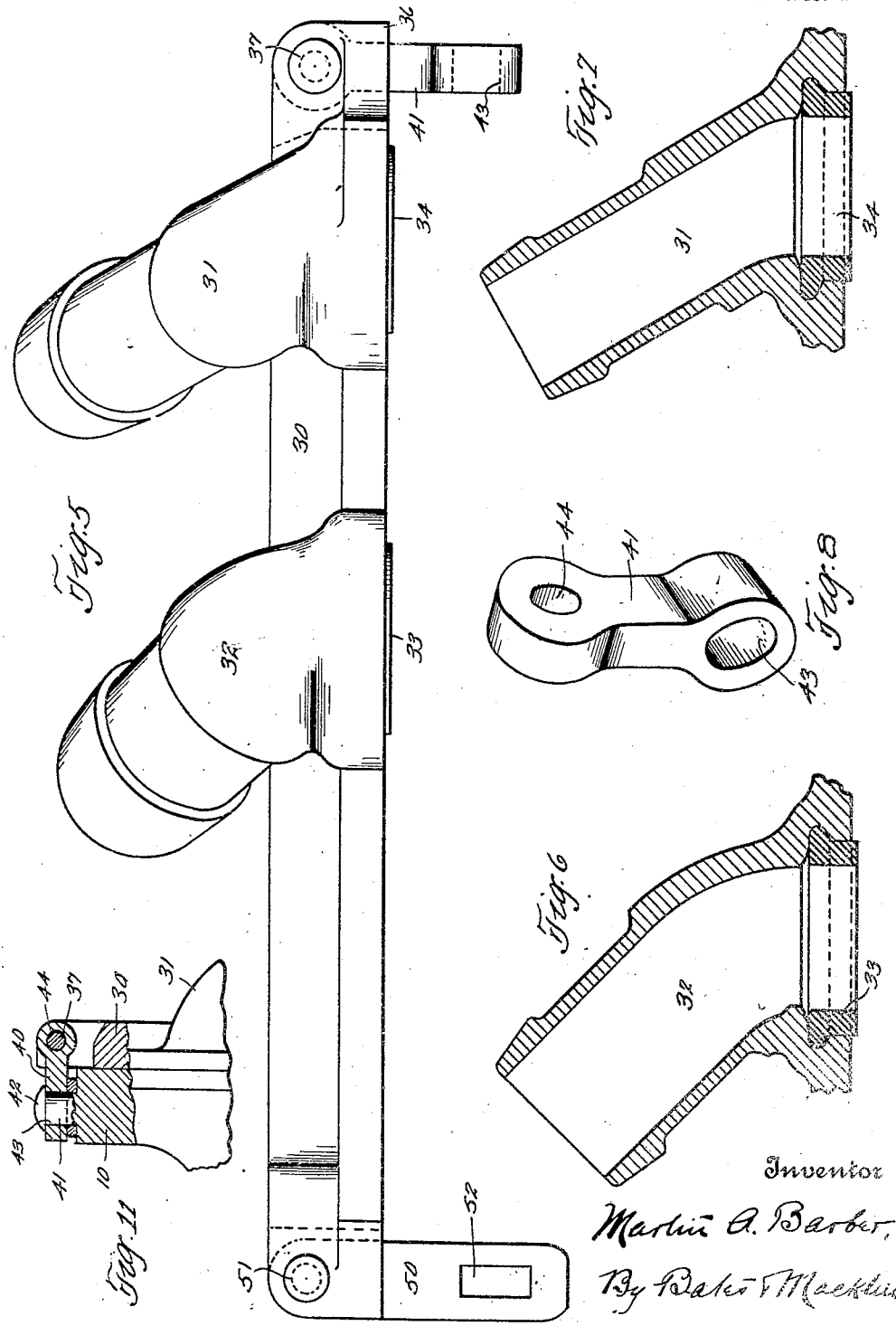

MARTIN A. BARBER, OF CLEVELAND, OHIO, ASSIGNOR TO THE AMERICAN AUTOMATIC CONNECTOR COMPANY, OF CLEVELAND, OHIO, A CORPORATION OF OHIO.

TRAIN-PIPE CONNECTOR.

1,347,836.           Specification of Letters Patent.      Patented July 27, 1920.

Application filed March 24, 1919. Serial No. 284,810.

*To all whom it may concern:*

Be it known that I, MARTIN A. BARBER, a citizen of the United States, residing at Cleveland, in the county of Cuyahoga and State of Ohio, have invented a certain new and useful Improvement in Train-Pipe Connectors, of which the following is a full, clear, and exact description, reference being had to the accompanying drawings.

This invention relates to connectors for coupling train pipes, and particularly to an interchange device whereby the air conduits of an automatic connector on one car may be coupled with the air conduits of another car not equipped with an automatic connector. Automatic connectors for train pipes are gradually coming into use in place of the old hand connecting devices, and during the transition period a simple and effective interchange device is very desirable.

One form of automatic connector which has been demonstrated to be efficient has a spring pressed coupling head supported by the train coupler and provided on one side with a projection and on the other with a recess. Such a connector is shown for instance in Patent No. 1,161,403 granted November 23, 1915, to A. L. Moler and his assignees. When two cars are equipped with such automatic connectors, the projection of each enters the recess of the other centering the heads and causing gaskets around the train pipe orifices carried by the heads to come into abutting engagement to establish air tight communication.

The present invention is designed to take care of the emergency where one car is provided with such an automatic connector as described, while the other car coupled to it has simply the usual hand connectors on the train pipes. To provide for this I furnish an attachment so secured to the connector head that it may be swung back into idle position when both cars are equipped with connectors but may be swung forward onto the face of the connector head and supply the equivalent of the usual train pipe connection for use whenever the other car is not equipped with the automatic connector.

My invention includes the combination with an automatic connector, of a coupling device mounted on and movably connected with the connector head and adapted to be secured in an air-tight engagement to the face thereof and having one or more hand connectors carried by it, which thus may be maintained in communication with corresponding conduits of the automatic connector. This enables the interchange to be made whenever desired by simply swinging the attachment onto the face of the connector head and there securing it, while when the interchange is not desired the coupling device is simply swung back to idle position.

My interchange device is hereinafter more fully described in connection with the accompanying drawings, which show it incorporated with an automatic connector of the type referred to, the specific automatic connector shown forming the subject matter of my pending application No. 227,330, filed April 8, 1918. The present invention is hereinafter more fully explained in connection with these drawings, and its essential characteristics are summarized in the claims.

In the drawings, Figure 1 is a side elevation of the end portions of two cars equipped with automatic connectors in connected position, my interchange devices being shown in idle position; Fig. 2 is a side elevation of two coupled cars, one of which has simply the ordinary hand connections and is coupled with the automatic connector by means of my interchange device; Fig. 3 is an end view of the automatic connector illustrated; Fig. 4 is a view of the same with the interchange device in place on the face thereof; Fig. 5 is a side elevation of the interchange device detached; Figs. 6 and 7 are central sections through the two conduits of the interchange device; Fig. 8 is a perspective of the link by which the interchange device is permanently but movably connected with the connector head; Fig. 9 is a perspective of the slotted link for connecting the other end of the interchange to the connector head; Fig. 10 is a perspective of the locking wedge adapted to be used in the slot of the link shown in Fig. 9; Fig. 11 is a fragmentary vertical section through the upper portion of the connector head and interchange device in active position.

Referring first to Fig. 1, A and A' indicate two railway cars; B the couplers thereof; C brackets depending from the couplers and carrying the automatic connectors to which train pipes lead. In Fig. 2, one of the same cars A is shown but the other car A' has no automatic connector but simply the usual hand connectors on its train pipes.

The automatic connector shown has a head 10 with orifices for train pipes and a projection 11 on one side thereof and a recess 12 on the other side. The head shown provided with a shank 14 has a sliding and universally movable connection with the bracket C, depending from the train coupler while a strong compression spring 15 surrounding the shank presses the head longitudinally, the spring being compressed when the heads are coupled. The connector is shown as having three orifices 17, 18, and 19 (Fig. 3), which are, respectively, for the air signal, air brake and the steam pipe, each of these orifices communicating with an individual conduit in the connector head, and the train hose, designated 21, 22 and 23, being connected to these conduits.

The construction described in the above paragraph is substantially disclosed in the patent and application heretofore referred to. It should be understood, however, that the present invention is not limited to that particular connector.

My interchange device comprises a body 30 equipped with one or more conduits and with means for holding the body against the face of the connector so that the interchange conduit or conduits will be in communication with the corresponding conduit or conduits of the automatic connector. In the embodiment shown, the body 30 is in the form of a bar carrying conduits 31 and 32 adapted to communicate respectively with the air signal and the air brake connections of the automatic connector. The conduits 31 and 32 are connected with short flexible extensions 61 and 62 which have the usual hand connectors 63 adapted to coact with hand connector 64 of the usual train pipes 27 and 28, as shown on the car A' in Fig. 2.

The bar 30 has sunk in its face annular recesses at each of its conduit connections, and suitable annular gaskets as 33 and 34, Figs. 6 and 7, occupy these recesses and, project from them in position to make an air tight connection with corresponding projecting gaskets in the connector head, such as shown at 16 in Fig. 3, when the bar 30 is drawn tightly against the connector head. To secure the body in this position, or allow it to be free and turned back out of the way when desired, I provide the following means:

Rising centrally from the top of the connector head 10 is a stud 41. Swiveled on this stud is a link 40, the stud extending through an eye 43 of the link and being upset above it as shown as 42 in Fig. 11. The link 40 extends into a notch 36 in the upper end of the bar 30, the link being pivoted to the body at this point by a horizontal pin 37, passing through an eye 44 in the link. The universal connection described enables the bar to stand vertically against the face of the connector head 10, as shown in Figs. 2 and 4, or be turned back into idle position behind the connector head, as shown in Fig. 1.

The lower end of the interchange body is bifurcated and is occupied by a link 50 pivoted to the body by a horizontal pin 51 and having a free portion adapted to extend through an opening 55 in the coupler head, this link having a slot 52 through it adapted to stand back of the coupler head when the parts are in active position. A wedge shown at 57 in Figs. 2 and 10 is designed to be driven into the opening 52 on the rear face of the connector head. This wedge is preferably retained by a suitable chain 58 attached to the interchange device, so that it will not become displaced when not in use.

In the particular embodiment shown, the bar 30 is recessed or cut away on the side which comes next to the projection or cone 11 of the connector head as shown at 38 in Fig. 4. This allows the bar to seat properly across the orifices of the head. The material of the bar on the other side and a rib 39 give it the necessary strength and stiffness.

When two train connectors are connected together as illustrated in Fig. 1, the interchange devices are idle and lie back behind the connector heads. When, however, it is desired to couple a car having an automatic connector with the car not so equipped, the interchange bar is simply lifted up into an approximately horizontal position swinging on its pivotal connection 37 with the link 40 and then, when the bar is approximately horizontal, the bar and the link are swung around in a horizontal plane (swiveling on the pin 41) until the bar is in front of the connector head when it is swung down into the vertical position as shown in Figs. 2 and 4. In this position, the link 50 passes through the notch 55 in the coupler head and the wedge 57 locks the bar tightly in place. This compresses the gaskets of the interchange device against the gaskets 16 of the automatic connector, putting the conduits 31 and 32 in air tight communication with the pipes 21 and 22.

Fig. 1 illustrates an automatic connector designed for passenger service and thus having connections for air signal, air hose and steam pipe. For freight service, the air signal and steam pipe are ordinarily omitted so that there is simply the central connection 18 in the automatic connector. In that case the interchange device is the same as described except that the conduit 31 is entirely omitted.

I have not shown any interchange connection for the steam pipe. This is not believed to be necessary even in passenger service, for the steam pipes are idle during the summer time which is the period when cars would ordinarily be in the process of changing from hand connections to automatic connections; however, where it is necessary to provide a steam connection between cars, one of which has the automatic connection and the other the hand connection, the steam pipe 23 may be disconnected from the automatic connector at the union 24 (Fig. 2) and the usual hand connection applied. Fig. 2 indicates at 29 the idle steam pipe on the car A'; the two air pipes 27 and 28 of which are connected with the hose of the car A by means of my interchange device.

Having thus described my invention what I claim is:—

1. The combination, with an automatic train pipe connector having a head and a conduit terminating in an orifice at the head, of an interchange device having a conduit coupled with a hand connector and terminating in an orifice, means for rigidly clamping the interchange device in an air tight manner against the face of the connector head with said orifices in registration, and means for permanently but movably connecting the interchange device with said train pipe connector.

2. The combination, with an automatic train pipe connector having a head with an orifice, of an interchange device permanently connected to said head in such manner that it may lie against the face of it or be swung out of registration with said face, said interchange device having a hand connector and a conduit adapted to communicate with the orifice in the head, and means for holding the interchange device tightly against the head.

3. The combination, with an automatic train pipe connector having a head with an orifice, of an interchange device movably connected to said head, and adapted to lie against the face of it or be swung back behind it, said interchange device having an orifice adapted to register with the orifice in the head, and having a hand connector and a conduit between it and the orifice of the interchange device, and means for holding the interchange device tightly against the head.

4. The combination, with an automatic train pipe connector having a head with an orifice, a bar universally connected to the top of the head and adapted to stand vertically across the face of it or be swung behind the head, a hand connector and a conduit therefor carried by said bar adapted to communicate with a conduit having its orifice in the head, and means for holding the bar tightly against the face of the head.

5. The combination, with an automatic train pipe connector having a head with an orifice, a projection on one side of the orifice, a recess on the other, a bar universally connected to the top of the head and adapted to stand vertically across the face of it between the projection and recess or be swung behind the head, a hand connector and conduit therefor carried by said bar and adapted to communicate with the orifice in the head, and means for holding the bar tightly against the face of the head.

6. In a train pipe connector, the combination of a head, having an orifice, a bar adapted to lie against the face of the head and having an orifice adapted to register with the orifice of the head, a link pivoted at one end to the end of the bar and pivoted at the other end to the head, said pivots extending transversely of each other.

7. In a train pipe connector, the combination of a head, having an orifice, a bar adapted to stand against the face of the head and having a hand connector in communication with an orifice at the inner face of the bar which is adapted to register with the orifice of the head, a link pivoted to the upper end of the bar on a horizontal pivot and to the upper end of the head on a vertical pivot.

8. In a train pipe connector, the combination of a head, having an orifice, a bar adapted to stand vertically against the face of the head and having a conduit adapted to register with the orifice of the head, a link pivoted to the upper end of the bar on a horizontal pivot and to the upper end of the head on a vertical pivot, a member carried by the bar and adapted to extend through an opening in the head, and means engaging said member for drawing the bar tightly against the head.

9. The combination with an automatic train pipe connector having a head with an orifice, a bar universally connected to the head and adapted to lie across the face of it or be swung behind the head, a hand connection carried by said bar adapted to communicate by a conduit with an orifice in the bar adapted to register with said orifice in the head, a link carried by the bar and adapted to extend through a notch in the head, and a wedge adapted to be driven through said link on the rear side of the head.

10. In a train pipe connector, the combination of a head, having orifices in vertical alinement, a bar adapted to stand vertically against the face of the head and having conduits adapted to register with the orifices of the head, a link pivoted to the upper end of the bar on a horizontal pivot and to the upper end of the head on a vertical pivot, another link carried by the bar and adapted to extend through a notch in the head, and a wedge adapted to be driven through the last mentioned link on the rear side of the head.

11. The combination, with a train pipe connector, having a row of orifices in its face, provided with gaskets, a projection and recess on the opposite sides of the said row, a bar adapted to stand vertically against the face of the head opposite the row of orifices, said bar having orifices adapted to register with the orifices of the head, conduits leading from the orifices of the bar, flexible connections communicating with the conduits, coupler heads on said flexible connections, a universal connection between the upper end of the bar and the top of the connector head, and means adapted to lock the lower end of the bar to the lower portion of the connector head.

12. The combination, with a train pipe connector, having an orifice in its face provided with a gasket, a bar adapted to stand against the face of the head, opposite the orifice, said bar having an orifice adapted to register with the orifice of the head and carrying a gasket adapted to engage the gasket of the head, a conduit leading from the orifice to the bar, a flexbile connection communicating with said conduit, a coupler head on said flexible connection, a link pivoted on a horizontal pivot to the upper end of the bar and on a vertical pivot to the top of the head, a link pivoted on a horizontal pivot to the lower end of the bar and adapted to occupy a notch in the lower end of the head and a wedge adapted to be driven through a notch in the last mentioned link on the rear face of the head.

In testimony whereof, I hereunto affix my signature.

MARTIN A. BARBER.